T. J. MULLEN & T. F. BRENNAN.
SHOCK ABSORBER.
APPLICATION FILED JULY 19, 1911.
1,058,253. Patented Apr. 8, 1913.
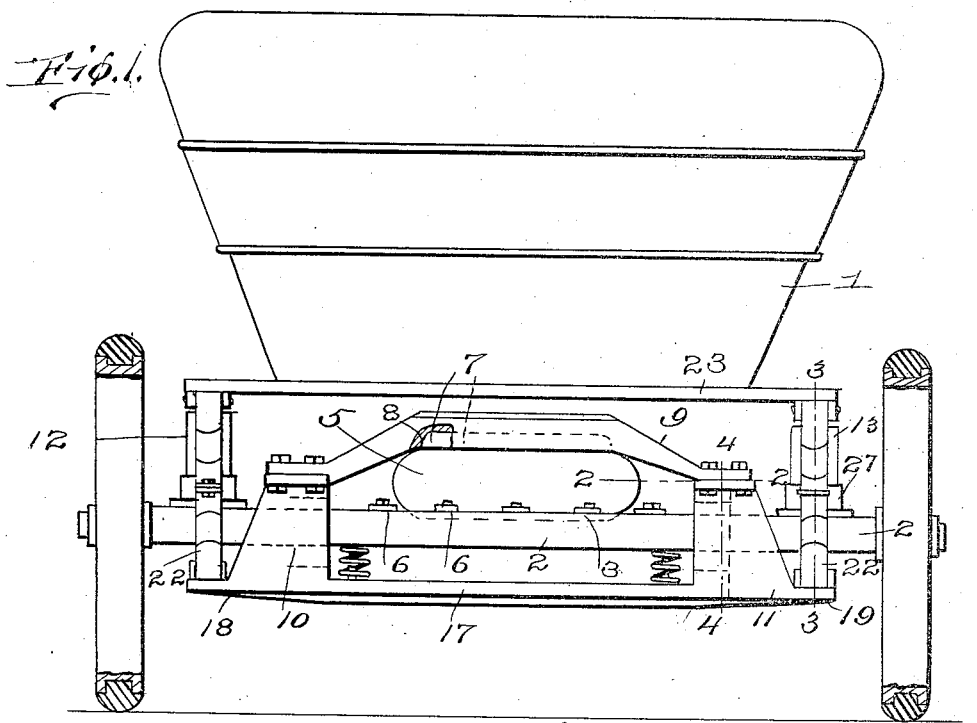
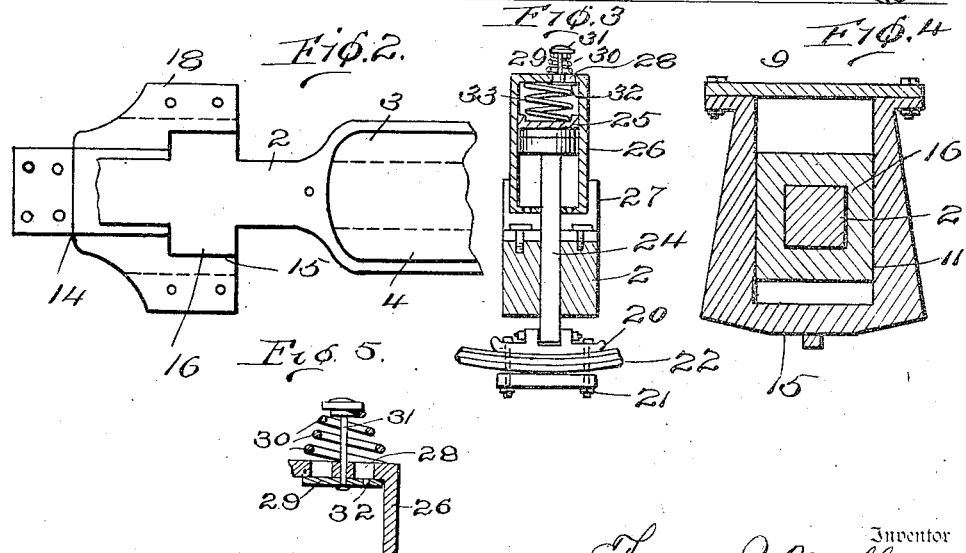
Witnesses
J. N. Fowler Jr.
O. L. Kitchin
Inventor
Thomas J. Mullen
Thomas F. Brennan
By Mason Fenwick Lawrence
his Attorneys

UNITED STATES PATENT OFFICE.

THOMAS J. MULLEN AND THOMAS F. BRENNAN, OF NEW BRIGHTON, NEW YORK.

SHOCK-ABSORBER.

1,058,253.  Specification of Letters Patent.  Patented Apr. 8, 1913.

Application filed July 19, 1911. Serial No. 639,317.

*To all whom it may concern:*

Be it known that we, THOMAS J. MULLEN and THOMAS F. BRENNAN, citizens of the United States, residing at New Brighton, in the county of Richmond and State of New York, have invented certain new and useful Improvements in Shock-Absorbers; and we do hereby declare the following to be a full, clear, and exact description of the invention, such as will enable others skilled in the art to which it appertains to make and use the same.

This invention relates to improvements in springs for vehicles, and particularly to an improved arrangement of shock absorber comprising an air bag, and means for transmitting motion from the body of the vehicle to the air bag for resiliently taking up any shocks on the body of the vehicle.

The object in view is the arrangement of one or more air bags for each axle of the vehicle between the axle and the body of the vehicle, the same being associated with movable members for permitting shocks to be absorbed by the air bag, and for taking up to a large extent any rebound.

A further object of the invention is the arrangement in a shock absorber, of a reciprocating member defining a carriage to which is connected a reciprocating rebound air cushion, and also to which is connected the body of a vehicle for taking up any shocks, and for limiting the rebound and at the same time cushioning the effect thereof.

With these and other objects in view the invention comprises certain novel constructions, combinations, and arrangement of parts as will be hereinafter more fully described and claimed.

In the accompanying drawings: Figure 1 is a rear view of an automobile, the same having disclosed thereon an embodiment of the invention. Fig. 2 is a section through Fig. 1 on line 2—2, the same being shown on a slightly enlarged scale. Fig. 3 is a section through Fig. 1 on line 3—3, the same being shown on a slightly enlarged scale. Fig. 4 is a section through Fig. 1 on line 4—4, the same being shown on a slightly enlarged scale. Fig. 5 is an enlarged fragmentary sectional view through part of the rebound device showing the arrangement of an air valve embodying certain features of the invention.

In forming a shock absorber embodying the invention a single air bag preferably is provided for each axle, to which is connected a reciprocating frame guided by the axle, and to which is connected a rebound absorbing device. This rebound absorbing device is designed to use an air cushion for absorbing rebound, though if desired a spring may be utilized for assisting or entirely absorbing the rebound. The body of the vehicle is connected with the reciprocating frame, either by springs or otherwise as desired, so that all shocks will be first transmitted to the air bag and from thence to the body of the vehicle, the transmission to the body of the vehicle being of course only slight compared to that conveyed to the air bag as the air bag absorbs a large per cent. of the shock.

In order that the invention may be more clearly understood an embodiment of the same is shown in the accompanying drawings in which—

1 indicates the body of a vehicle, and 2 one of the axles thereof. The vehicle, of course, may have any desired number of axles, and preferably to each axle are connected an air bag and associated members defining a shock absorber. Axle 2 is preferably widened at 3 in the usual manner, or if not widened an auxiliary plate is bolted to the axle. In the socket 4 of the widened portion 3 is arranged the bottom of air bag 5, which air bag is held rigidly in place by means of suitable lugs 6 bolted or otherwise connected with the axle 2. The upper part of the air bag 5 is formed with a projection 7 which fits into a notched portion 8 in a cross bar 9. Cross bar 9 is preferably formed arc shaped and is rigidly connected to guiding boxes 10 and 11 by suitable bolts or screws. Air bag 5 is preferably made comparatively long in respect to the axle 2, and extends longitudinally thereof so as to prevent any undue swinging of the body 1. Also body 1 is prevented from swinging by the rebound absorbers 12 and 13. The guiding boxes 10 and 11 are each formed with a slot 14 for accommodating axle 2, and formed with a slot or guide way 15 for accommodating an enlarged squared portion 16 either formed integral with axle 2 or rigidly secured thereto. The use of the squared portion 16 and the ways 15 prevents any swinging of the guiding boxes 10 and 11, and of bar 9, but permits a free up and down movement thereof, and also permits a slight tilting movement longitudinally of the axle. The boxes 10 and 11 are formed integral with or rigidly secured to a cross bar 17, which cross bar is provided with extensions 18 and 19 to which are secured plates 20 (Fig. 3), by suitable bolts 21. Passing between plates 20 and extensions 18 and 19 are leaf springs 22. These springs are connected to the cross bar 23 rigidly secured to the body 1, whereby the body 1 is supported by the leaf springs, which in turn are supported by the extensions 18 and 19 projecting from cross bar 17. It will be of course evident that other means than the leaf springs 22 may be used for connecting cross bar 17 with cross bar 23.

Pivotally connected with each of the plates 20 is a piston rod 24 (Fig. 3) which passes through a suitable aperture in axle 2. Connected with the upper end of each of the piston rods 24 is a piston 25. Piston 25 is arranged in a cylinder 26 which is rigidly connected with axle 2 by being screwed into or otherwise connected with a socket member 27, which socket member is held to axle 2 by suitable screws or bolts. The lower end of the cylinder 26 is open to the atmosphere, while the upper end is provided with an opening 28 normally closed by a valve member 29 held in place by spring 30. Spring 30 acts against the upper end of cylinder 26, and against bolt 31 which is rigidly secured to valve member 29. Valve member 29 is provided with a vent 32 so that when the piston 25 is pulled down, and then attempts to move upward again the air will escape comparatively slowly therefrom so as to reduce the speed of movement of the piston. By this structure when a shock is to be absorbed by bag 5 the piston rods 24 will pull down the pistons 25. This will cause valve member 29 to become unseated and allow the free entrance of a large column of air. Upon the return movement of body 1 the pistons 25 will compress the air in cylinders 26 and tightly close valve member 29. However, the air may escape through vents 32 so that in a short time the pistons 25 will assume their original position, but sufficiently slow to negative any sudden rebound or return movement of the body 1. Of course vents 32 may be made of any desired size, and also may be changed in size if desired for permitting the return of the pistons 25 at any desired speed. If desired a spring 33 could be used for assisting the air in absorbing the rebound, or could be used independently of the air by removing valve member 29.

What we claim is:

1. In a shock absorber of the class described, the combination with a vehicle provided with a body and an axle, of an air bag resting on said axle, a reciprocating cross member engaging said air bag and pressing the same against said axle, a pair of reciprocating guiding members striding said axle, means for rigidly securing said reciprocating guiding members with said reciprocating member, a connecting bar extending longitudinally of said axle connecting said reciprocating guiding members, means for connecting said connecting bar with the body of said vehicle, whereby the weight of said vehicle is transmitted to said air bag, and a rebound absorbing device arranged at each end of said connecting bar.

2. In a shock absorber of the class described, the combination with a vehicle provided with a body and an axle, of an air bag contacting with said axle, a cross bar engaging said air bag, a pair of guides engaging said cross bar and said axle for guiding the cross bar in its movement, a connecting cross bar for connecting said guiding members, means for connecting said connecting cross bar with said body, and a rebound absorber interposed between said axle and said connecting cross bar.

3. In a shock absorber of the class described, the combination with a vehicle provided with an axle and a body, of an air bag placed on said axle, a cross bar engaging said air bag and pressing same against said axle when moved, means for connecting said cross bar with the body of the vehicle for causing said air bag to absorb the shocks, and a rebound absorber arranged near each end of said cross bar, each of said rebound absorbers comprising a piston connected with said cross bar and moved thereby, a cylinder for each of said pistons open to the atmosphere at one end, a valve arranged at the opposite end formed with a vent and adapted to open freely upon the movement of said piston in one direction and to close upon the movement of the piston in the opposite direction, whereby the air may escape only through said vent.

4. In a shock absorber of the class described, the combination with a vehicle provided with an axle and body, of an air bag arranged to rest on said axle, a cross bar pressing against said air bag, means for connecting said body with said cross bar, including guiding members for holding the cross bar in proper position for continually engaging said air bag, and a pair of rebound absorbers connected with said last mentioned means and said axle, each of said rebound absorbers comprising a pivotally mounted piston rod connected with said last mentioned means, a piston connected with each of said piston rods, a cylinder connected with said axle, and means associated with said cylinder for resiliently resisting a return movement of the piston when moved in one direction.

5. In a shock absorber of the class described, the combination with a vehicle provided with a body and an axle, of an air bag contacting with said axle, a cross bar engaging said air bag, a reciprocating guide frame secured to said cross bar and engaging said axle for guiding the cross bar in its movement, means for connecting the guiding frame to the body and a rebound member having a cylinder connected to the axle and a piston moving therein secured to the reciprocating guide frame.

In testimony whereof we affix our signatures in presence of two witnesses.

THOMAS J. MULLEN.
THOMAS F. BRENNAN.

Witnesses:
  J. H. SEARLE,
  FRANK J. MULLEN.